United States Patent
Hikosaka

(10) Patent No.: US 8,228,545 B2
(45) Date of Patent: Jul. 24, 2012

(54) IMAGE READING APPARATUS AND IMAGE FORMING APPARATUS

(75) Inventor: Ariyoshi Hikosaka, Osaka (JP)

(73) Assignee: Kyocera Mita Corporation (JP)

(*) Notice: Subject to any disclaimer, the term of this patent is extended or adjusted under 35 U.S.C. 154(b) by 476 days.

(21) Appl. No.: 12/603,604

(22) Filed: Oct. 22, 2009

(65) Prior Publication Data

US 2010/0110484 A1    May 6, 2010

(30) Foreign Application Priority Data

Oct. 30, 2008   (JP) ................. 2008-280105

(51) Int. Cl.
*G06F 15/00* (2006.01)
*G06F 3/12* (2006.01)
*G06K 1/00* (2006.01)

(52) U.S. Cl. ...................... 358/1.15; 358/1.13
(58) Field of Classification Search ............ None
See application file for complete search history.

(56) References Cited

U.S. PATENT DOCUMENTS

| | | | |
|---|---|---|---|
| 7,548,340 B2 * | 6/2009 | Ishikawa et al. | 358/1.9 |
| 8,009,305 B2 * | 8/2011 | Ishikawa et al. | 358/1.14 |
| 2004/0184065 A1 | 9/2004 | Guan et al. | |
| 2005/0078331 A1 | 4/2005 | Guan et al. | |

FOREIGN PATENT DOCUMENTS

| | | |
|---|---|---|
| JP | 2001094779 | 4/2001 |
| JP | 2001-346032 | 12/2001 |
| JP | 2004-274092 | 9/2004 |
| JP | 2007124169 | 5/2007 |
| JP | 2008206196 | 9/2008 |

* cited by examiner

*Primary Examiner* — Douglas Tran
(74) *Attorney, Agent, or Firm* — Gerald E. Hespos; Michael J. Porco

(57) ABSTRACT

A user inputs an ID and password, using an operating panel. When a start key is pressed to instruct the start of copying of a document, a dot pattern detection unit detects, from image data, a dot pattern formed according to a predetermined period. When a dot pattern is detected, a display control unit causes an operating panel to display a message indicating that a dot pattern has been detected. When the continuation of a copying operation is instructed, then after the completion of reading of the document, the image log generation unit generates an image log and log information and image log transmit ion control unit transmits the image log and log information to a computer of an administrator.

8 Claims, 6 Drawing Sheets

FIG.3

| INDIVIDUAL ID | PASSWORD |
|---|---|
| 0012 | 1234 |
| 0234 | 4321 |
| 5678 | 9012 |
| ⋮ | ⋮ |

111

IMAGE READING APPARATUS AND IMAGE FORMING APPARATUS

BACKGROUND OF THE INVENTION

1. Field of the Invention

The present invention relates to an image reading apparatus capable of detecting a dot pattern formed according to a predetermined period, and to an image forming apparatus having an image reading apparatus of this kind.

2. Description of the Related Art

A method is known in which security is imparted to a printed matter by synthesizing pattern image data with document data created by a computer, inside an image forming apparatus such as a printer. In addition to a pattern image which is formed as a dot pattern and causes a warning text such as "COPY" to emerge when the image duplicated, there is also a pattern image which can embed output information, such as printer information, the print date, and so on, as an electronic watermark. It can be considered that by printing a pattern image of this type, security processing of some kind can be applied to the document, and therefore it is possible to restrict illegal reproduction or illicit procurement of a original document.

Moreover, a copying machine comprising a copy guard function is known, in which, if a mask pattern which incorporates a special dot pattern is printed together with a document image, and it is then sought to duplicate the original document, copying of the document is prohibited by means of the copying machine recognizing the dot pattern, or alternatively, rather than printing the document, a solid image pattern, for example, is formed so as to prevent leaking of the information in the document.

SUMMARY OF THE INVENTION

The present invention further improves the prior art technology described above.

In other words, the present invention includes: a reading unit which acquires a document image by reading a document; a detection unit which detects whether or not the document image contains a regular dot pattern in which dots formed according to a predetermined period are arranged in a regular fashion; a generation unit which generates a simplified document image from the document image; a creation unit which creates log information relating to a reading process by the reading unit; and a transmission unit which transmits the simplified document image and the log information to a predetermined external apparatus, when the regular dot pattern has been detected.

BRIEF DESCRIPTION OF THE DRAWINGS

FIG. 3 is a diagram showing the data composition of an ID information storage unit;

DETAILED DESCRIPTION OF THE PREFERRED EMBODIMENTS

Below, the image reading apparatus and the image forming apparatus according to the present invention are described. The image forming apparatus relating to the present embodiment comprises the image reading apparatus according to the present invention and a copying machine is described as an example of an image forming apparatus. Apart from this, the image forming apparatus may also be a multi-functional peripheral which incorporates the functions of a copier, scanner, facsimile and printer.

Figure 1:
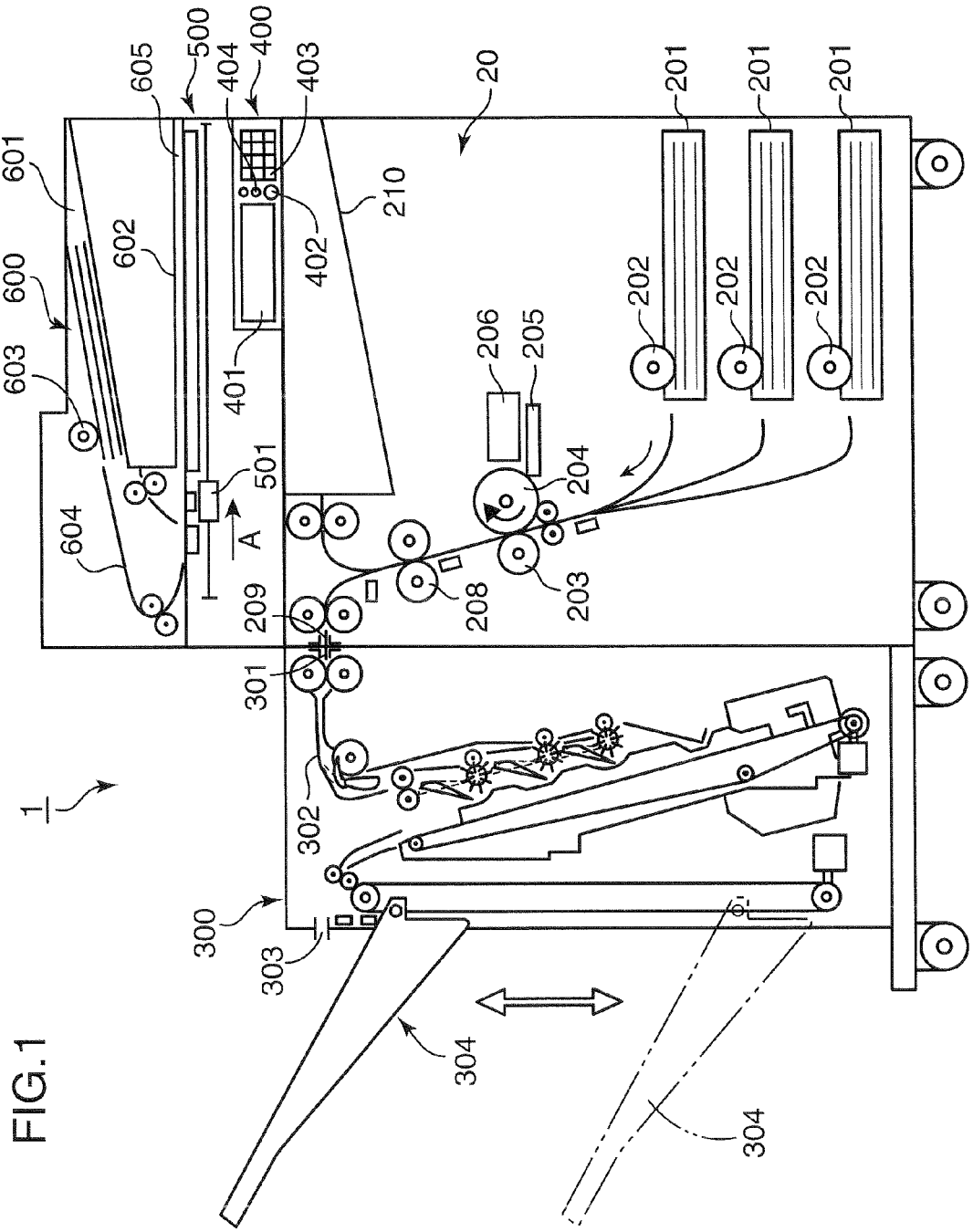
FIG. 1 is a side view schematic drawing principally showing the functional composition of a copying machine.

FIG. 1 is a schematic side view which principally shows the mechanical composition of the copying machine 1 according to the present embodiment. The copying machine (image reading apparatus, image forming apparatus) 1 comprises a main unit 20, and a paper post-processing unit 300 which is disposed to the left-hand side of the main unit 20, an input operating unit 400 whereby a user can input various operational commands, and the like, a document reading unit 500 which is disposed above the main unit 20, and a document feeding unit 600 which is disposed above the document reading unit 500.

The input operating unit (instruction reception unit) 400 comprises an operating panel 401, a start key 402, a key pad 403 and a stop key 404, and the like. The operating panel 401 displays operating screens of various kinds, as well as displaying various operating buttons, and the like, whereby a user can input various operational commands. The start key 402 is employed by the user to input a print execution command, and the like, and the key pad 403 is used to input the number of prints to be made, and the like. The stop key 404 is used in order to halt a scanning or copying operation.

The document feeding unit 600 comprises a document placement unit 601, a document output unit 602, a paper supply roller 603, a document conveyance unit 604, and a contact glass 605, and the like.

The document reading unit (reading unit) 500 reads in the image of a document which is conveyed by the document feed unit 600. The document reading unit 500 comprises a scanner 501, and the like.

The paper supply roller 603 feeds out a document which has been set on the document placement unit 601, and the document conveyance unit 604 conveys the document that has been fed out, onto the scanner 501, one sheet at a time. The scanner 501 comprising a CCD (Charge Coupled Device) sensor, CMOS (Complementary Metal Oxide Semiconductor) sensor, exposure lamp, or the like, and sequentially reads in the conveyed documents and output corresponding image data. A document that has been read in is output to the document output unit 602. Furthermore, when the scanner 501 reads in a document placed on the contact glass 605, then the scanner 501 is caused to slide in a direction A by a drive unit (not illustrated), thereby reading in the document.

The main unit 20 comprises a plurality of paper supply cassettes 201, a plurality of paper supply rollers 202, a transfer roller 203, a photosensitive drum 204, an exposure apparatus 205, a developing apparatus 206, a pair of fixing rollers 208, an output opening 209 and an output tray 210.

The photosensitive drum 204 is charged uniformly by a charging apparatus (not illustrated) while rotating in the direction indicated by the arrow. The exposure apparatus 205 takes a modulated signal generated on the basis of the document image data read in by the document reading unit 500, converts the modulated signal to laser light and outputs the laser light, thereby forming an electrostatic latent image on the photosensitive drum 204. The developer apparatus 206 forms a toner image by supplying a developer to the photosensitive drum 204 to develop the electrostatic latent image on the photosensitive drum 204.

On the other hand, the paper supply roller 202 draws out recording paper from the paper supply cassette 201 in which recording paper is accommodated, and conveys the recording paper thus drawn out to the transfer roller 203. The transfer roller 203 transfers the toner image on the photosensitive drum 204 to the conveyed recording paper. The recording paper onto which the toner image has been transferred is conveyed to the fixing rollers 208, and the pair of fixing roller 208 heat the transferred toner image thereby fixing the image onto the recording paper. Thereupon, the recording paper is conveyed to the output opening 209 and then introduced into the paper post-processing unit 300. Furthermore, the recording paper is also output to the output tray 210, according to requirements.

The paper post-processing unit 300 comprises an input opening 301, a recording paper conveyance unit 302, an output opening 303, a stack tray 304, and the like. The recording paper conveyance unit 302 successively conveys the recording paper introduced from the output opening 209 into the input opening 301, and finally outputs the recording paper from the output opening 303 to the stack tray 304. The stack tray 304 is composed so as to be movable upwards and downwards in the direction of the arrows, in accordance with the number of sheets of recording medium conveyed out from the output opening 303.

Figure 2:
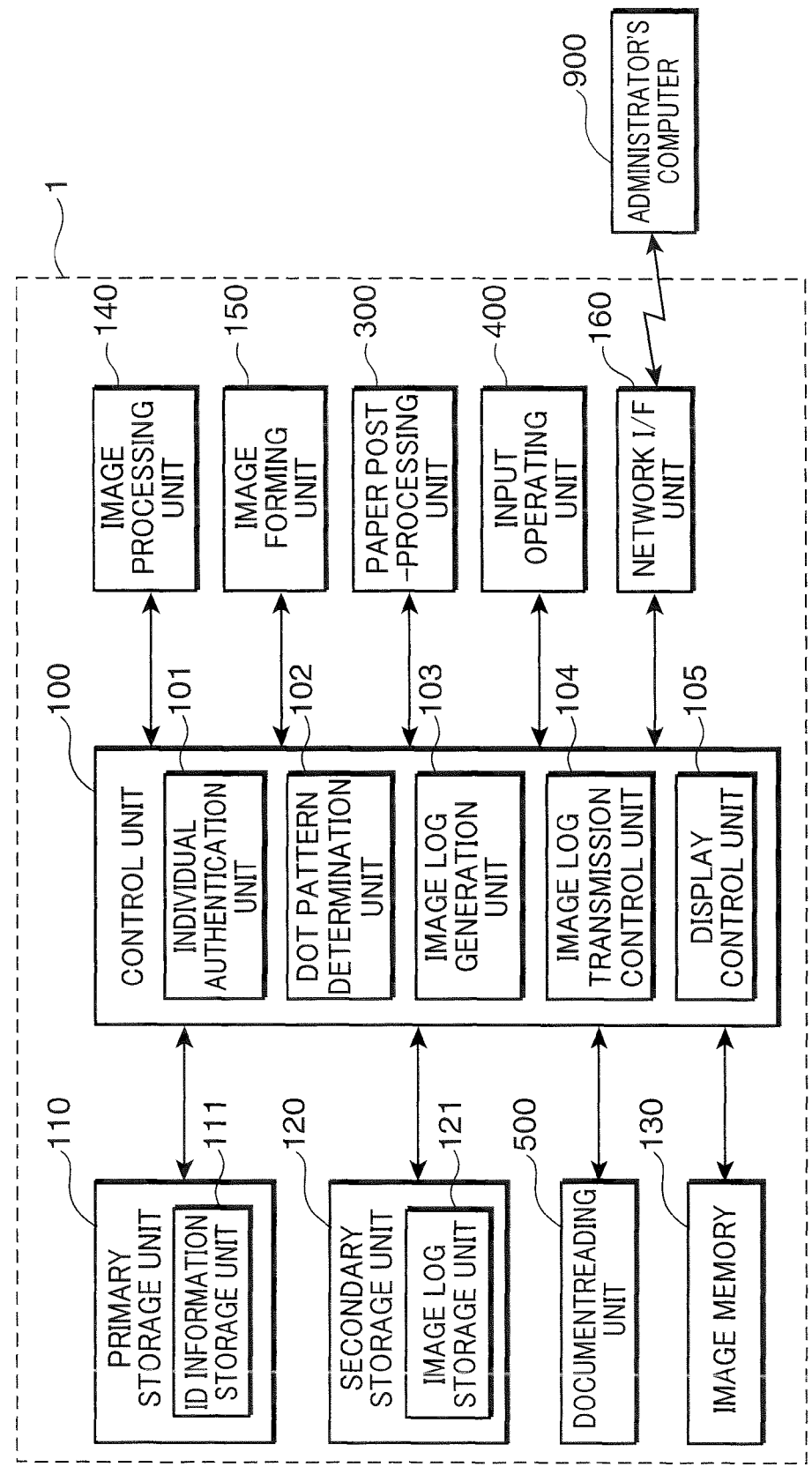
FIG. 2 is a functional block diagram showing the electrical composition of a copying machine.

FIG. 2 is a functional block diagram showing the electrical composition of a copying machine 1 according to the present embodiment. The copying machine 1 comprises a control unit 100, a primary storage unit 110, a secondary storage unit 120, a document reading unit 500, an image memory 130, an image processing unit 140, an image forming unit 150, a paper post-processing unit 300, an input operating unit 400 and a network interface (I/F) unit 160. Parts which are the same as the constituent elements of the copying machine 1 described with reference to FIG. 1 are labeled with the same reference numerals and description thereof is omitted here.

The control unit (erasure unit, halting unit) 100 is constituted by a CPU (Central Processing Unit), or the like, which reads out and executes a program stored in the primary storage unit 110 in accordance with an input instruction signal, or the like, and controls the copying machine 1 comprehensively by outputting instruction signals to the respective functional sections and transferring data, and the like. The control unit 100 comprises an individual authentication unit 101, a dot pattern detection unit 102, an image log generation unit 103, an image log transmission control unit 104 and a display control unit 105.

When an ID and password have been input by a user via the input operating unit 400, the individual authentication unit (identification unit) 101 carries out authentication processing to verify whether the ID and password stored in an ID information storage unit 111, which is described hereinafter, match the ID and password input by the user.

The dot pattern detection unit (detection unit) 102 detects a dot pattern formed according to a predetermined period (hereinafter, simply called "dot pattern") from a document image acquired by the document reading unit 500. Normally, the dot pattern forming the pattern image differs from the image processing pattern used for intermediate tone reproduction (dithering, or the like) in images such as photographs. Furthermore, the screen line number (dot pattern period) is different in the background portion and the latent image portion of the pattern image, and the dot pattern in either the background portion or the latent image portion is printed at an extremely low screen line number (for example 60 lines) so as not to be erased after copying. Generally, this number of screen lines is fixed and is rarely used in normal offset printing. For reasons such as these, the dot pattern detection unit 102 detects an image having a predetermined number of screen lines (for example, 60 lines). Consequently, the dot pattern detection unit 102 is able to detect the dot pattern forming a pattern image. The value of the number of screen lines used to detect the dot pattern is changed as appropriate.

Apart from a method which calculates the number of screen lines of the dot pattern as described above, the detection method used by the dot pattern detection unit 102 may also be a method which detects the presence or absence of a dot pattern by subjecting the document image to Gaussian filter processing, or the like, which is a smoothing filter process, and judges the presence or absence of regularity by calculating the magnitude of the variation in density after processing.

When a dot pattern has been detected from the document image, the image log generation unit (generation unit, creation unit) 103 firstly generates a simplified document image from image data read out by the document reading unit 500. Here, the simplified document image is an image in which the data size is reduced compared to the document image, by reduction processing or binarization processing, or the like, of the read out document image. By reduction or binarization of the image size of the document image, it is possible to reduce the data size of the simplified document image compared to the document image, and it is possible to reduce the capacity of the storage unit 121.

Moreover, the image log generation unit 103 generates log information, such as the date and time that the document image was read out by the document reading unit 500, the user ID, and so on, and generates an image log by appending this log information to the simplified document image. The image log thus generated is stored in the image log storage unit 121 described below.

The image log transmission control unit (transmission unit) 104 controls the network I/F unit 160 in order to send an image log to an administrator's computer 900. The display control unit 105 implements controls for displaying messages, buttons, and the like, of various kinds on the operating panel 401 of the input operating unit 400.

The primary storage unit 110 stores system programs, application programs, data, and the like, for achieving various functions provided in the copying machine 1. In the present embodiment, the primary storage unit 110 functions as an ID information storage unit 111. FIG. 3 is a diagram showing the data composition of an ID information storage unit 111. The ID information storage unit 111 stores, in mutually associated fashion, an ID and a password which are assigned to each user. The data stored in this ID information storage unit 111 is used when the individual authentication unit 101 carries out authentication processing.

The secondary storage unit 120 is an auxiliary storage apparatus, such as an optical disk or HDD (hard disk drive), and functions as an image log storage unit 121. The image log storage unit (storage unit) 121 stores the image log generated by the image log generation unit 103. Respective image logs are stored in association with a document number. The ID information storage unit 111 may also be located in the secondary storage unit 120.

The image memory 130 temporarily stores image data sent from an external apparatus via the network I/F unit 160. The image processing unit 140 carries out image processing, such as image correction, magnification or reduction, on the image data stored in the image memory 130. The image forming unit 150 forms an image on the basis of the image data output from the image memory 130, on the paper, and comprises the photosensitive drum 204, the exposure apparatus 205 and the development apparatus 206, and the like, shown in FIG. 1. The network I/F unit 160 is constituted by a communications module, such as a LAN board, and sends and receives data of various kinds to and from an external apparatus, such as the administrator's computer 900, via a network which is connected to the network I/F unit 160.

Figure 4:
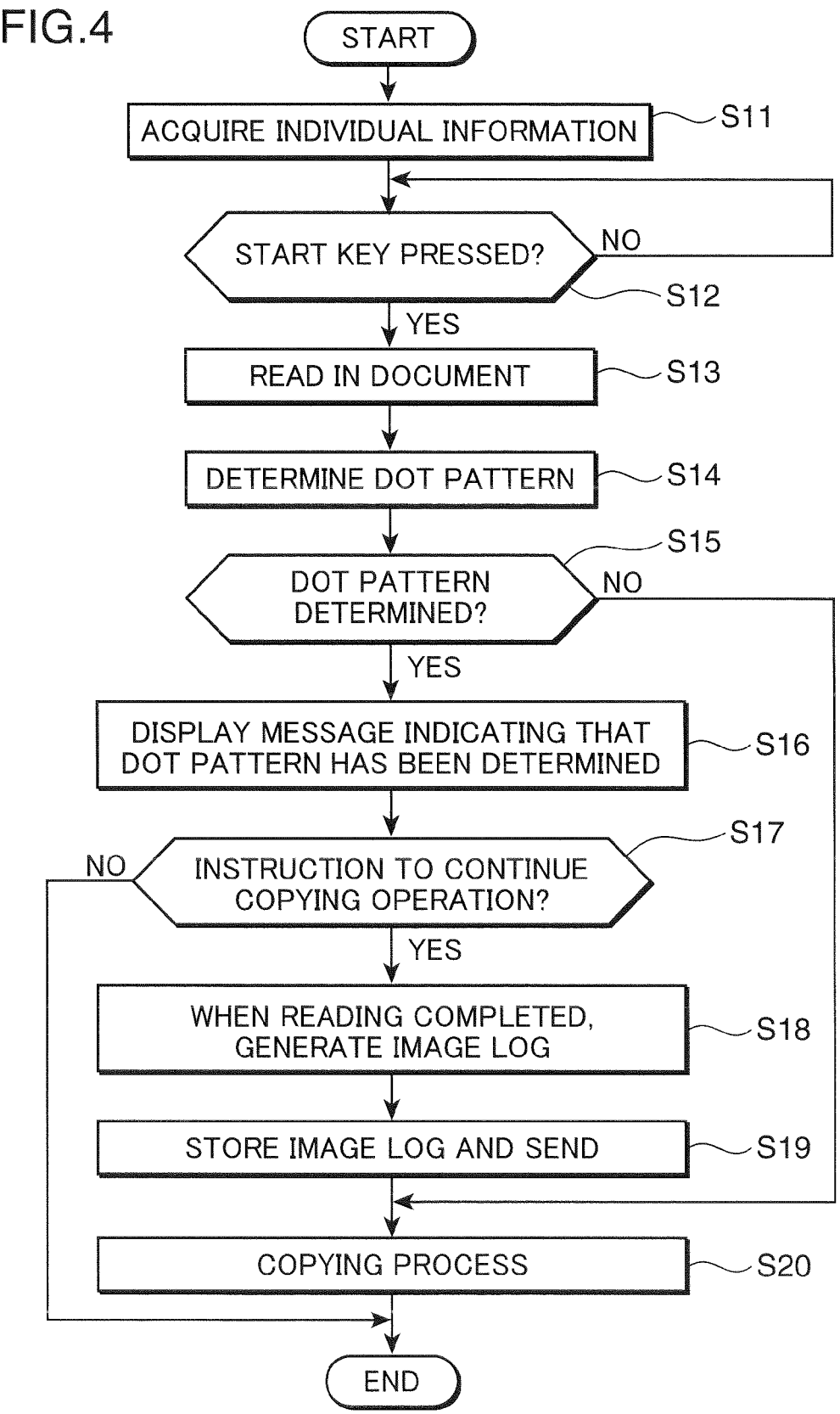
FIG. 4 is a flowchart showing one example of the flow of a copying process in a copying machine.
Figure 5:
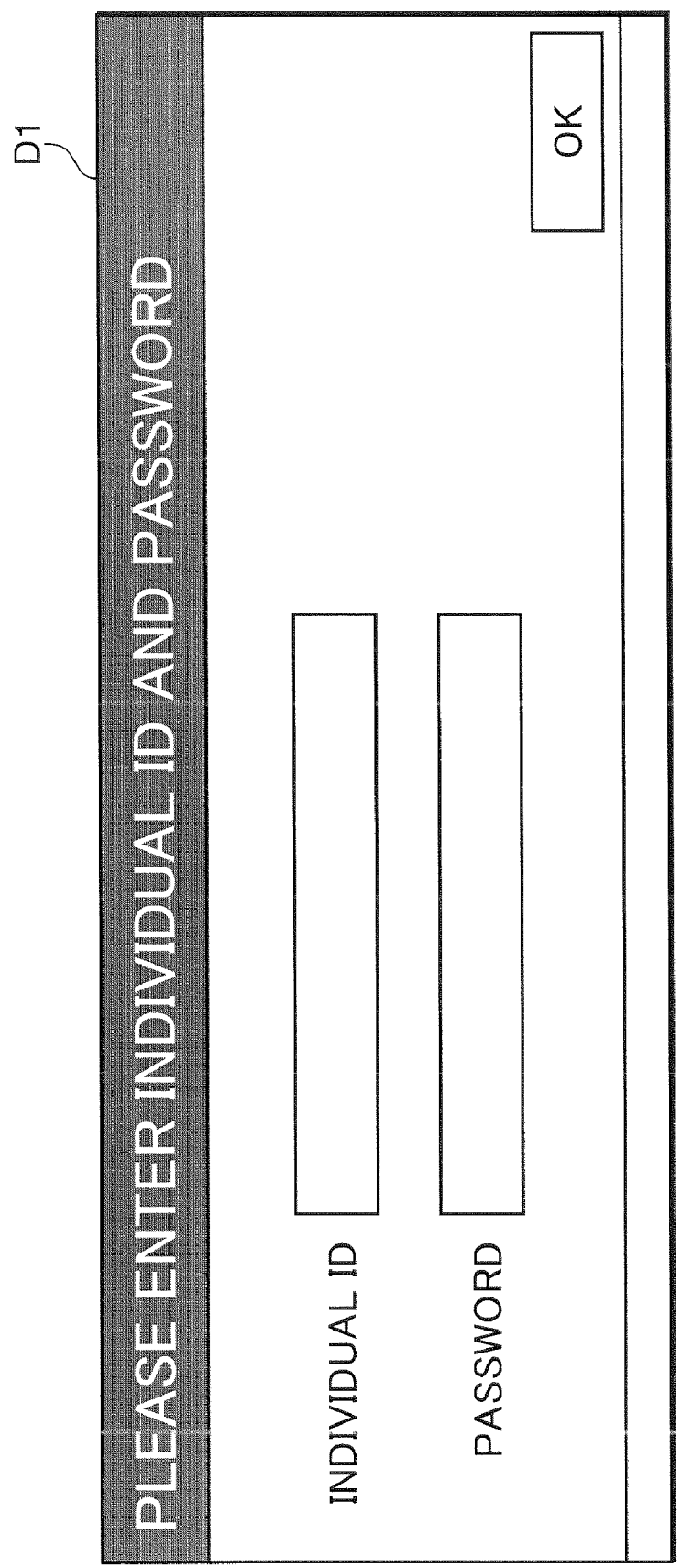
FIG. 5 is a diagram showing an example of the screen of an operating panel.
Figure 6:
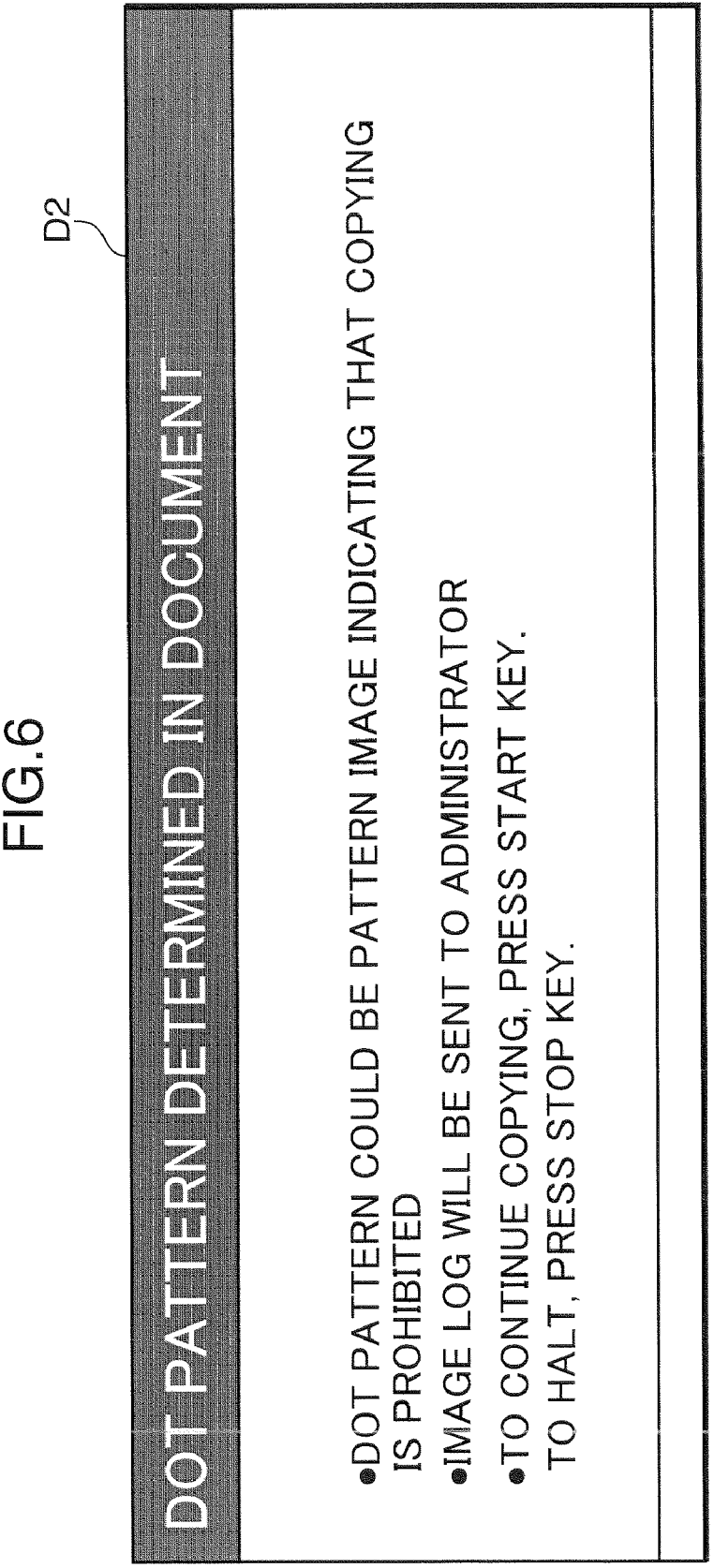
FIG. 6 is a diagram showing an example of the screen of an operating panel.

FIG. 4 is a flowchart showing one example of the flow of a copying process by a copying machine 1, and FIGS. 5 and 6 show examples of the screen of an operating panel 401. The flow of the copying process according to the present embodiment is now described with reference to FIGS. 4 to 6. The present invention can be applied to processing for reading in a document image only, but the description of the present embodiment takes a copying process as an example.

Firstly, the individual authentication unit 101 carries out authentication processing of the input user ID and password (step S11). More specifically, the display control unit 105 causes an ID and password input screen D1 such as that shown in FIG. 5 to be displayed on the operating panel 401. When the user inputs an ID and a password using the key pad 403, and the like, the individual authentication unit 101 performs authentication processing of the input ID and a password on the basis of the ID information storage unit 111. Besides a method which uses an ID and the password, the individual authentication can be performed using IC card authentication, or the like. In this case, the copying machine 1 comprises an IC card reader apparatus. It is possible to establish a setting which prohibits a scanning or copying operation of the original, if the individual authentication unit 101 has not performed user identification, for instance, if the ID or password are different.

When the start key 402 is pressed by the user (YES at step S12), the document reading unit 500 acquires a document image by reading in a document (step S13), and the dot pattern detection unit 102 detects a dot pattern from the document image (step S14).

If a dot pattern has been detected (YES at step S15), then the display control unit 105 causes the operating panel 401 to display a message, such as that shown in FIG. 6, indicating that a dot pattern has been detected (step S16). There is also a possibility that the user may make a copy of the document without knowing that a dot pattern (pattern image) has been printed in the document. Hence, by the display of a message indicating that a dot pattern has been detected, the effects of inhibiting a copying operation are increased.

Furthermore, if the pattern image is printed and the user recognize that the pattern image is printed and seeks to copy the document despite recognizing that the document is prohibited for reproduction, then it is possible further to increase the effects of inhibiting a copying operation by showing a message indicating that log information relating to this copying is to be notified to the administrator.

If the user has performed an operation instructing the continuation of the copying operation, in other words, if the user has pressed the start key 402 in the case of the screen D2 example shown in FIG. 6 (YES at step S17), then the document reading unit 500 continues the operation of reading the document image and when reading has been completed, the image log generation unit 103 generates an image log (step S18). The image log generation unit 103 stores the generated image log in the image log storage unit 121, and furthermore, the image log transmission control unit 104 sends the image log to the administrator's computer 900 via the network I/F unit 160 (step S19).

Furthermore, the image log generation unit 103 also generates a document number (a identification number) that is unique to the document, in respect of the document read in by the document reading unit 500, generates an image log by appending the document number to the log information and the document image, and stores the image log generated in this way in the image log storage unit 121; in the processing in step S19 described above, instead of sending an image log, the image log transmission control unit 104 may send (1) the document number or (2) the log information and document information in the image log, to the administrator's computer 900. By this means, it is possible readily to identify the document image that is the object of copying, while reducing the load on the image log transmission control unit 104 in transmission processing. In this case, desirably, the image log stored in the image log storage unit 121 should be erasable by only one particular person, such as the administrator.

The image forming unit 150 forms an image as indicated by the image data onto recording paper (step S20), and then terminates processing.

On the other hand, if a dot pattern has not been detected in the image data (NO at step S15), then the control unit 100 transfers processing to step S20. Furthermore, if a dot pattern has been detected and the user then performs an operation instructing a halt of the copying operation, in other words, in the case of the screen D2 example shown in FIG. 6, then if the user presses the stop key 404 (NO at step S17), the control unit 100 terminates the copying process.

As described above, it is possible to increase the beneficial effects of inhibiting illegal copying, by sending the image log to the administrator if a predetermined dot pattern is detected from the image data indicating the document image. In the case of a copying machine comprising a copy guard function, it is necessary reliably to detect a special dot pattern which indicates a copy guard, and therefore costs are increased by the provision of a memory for pattern matching, and increased complexity of image processing, and the like, but in the case of the present invention, it is possible to improve the effects of inhibiting copying of a document in which a pattern image has been printed, while restricting costs.

The present invention is not limited to the composition of the present embodiment and can be modified appropriately. For example, the image log generation unit 103 generates an image log if a dot pattern has been detected by the dot pattern detection unit 102, but it is also possible to generate an image log even if a dot pattern is not detected. It is possible to enable the administrator to set whether or not the resulting image log is to be erased from the image log storage unit 121, if a dot pattern has not been detected. By setting the image log to be erased from the image log storage unit 121 if a dot pattern has not been detected, then it is possible to increase the free capacity of the secondary storage unit 120.

Furthermore, it is also possible for the control unit 100 to erase an image log from the secondary storage unit 120 when the image log transmission control unit 104 has sent the image log to the administrator's computer 900. By adopting this composition, it is possible to increase the free capacity of the secondary storage unit 120.

Furthermore, it is also possible to switch to only sending an image log generated by the image log generation unit 103 to the administrator's computer 900 by the image log transmission control unit 104, without storing the image log in the image log storage unit 121 by the image log generation unit 103, if the free capacity of the secondary storage unit 120 is equal to or lower than a prescribed capacity.

Generally, a pattern image is formed by a dot pattern in which dots are arranged in a regular fashion. In other words, by detecting a dot pattern which is arranged in a regular fashion in this way, it is possible to detect a pattern image.

More specifically, normally, the dot pattern constituting the pattern image differs from the image processing pattern for representing intermediate tones (dithering, or the like) of a photographic image, or the like. The background portion and latent image portion of the pattern have mutually different dot pattern periods. Furthermore, the dot pattern of either one of the background portion and the latent image portion is printed at an extremely low dot pattern period (number of screen lines: for instance, 60 lines) so as not to be erased after image reading, and this period is rarely used in normal offset printing. The dot pattern period of the pattern image is normally fixed. Therefore, it is possible to detect a pattern image by detecting a regular dot pattern in which dots formed according to a predetermined period (for example, number of screen lines (60 lines)) are arranged in a regular fashion.

From this viewpoint, according to the present invention, if a regular dot pattern has been detected from the document image, then it is supposed that the document image includes a pattern image and that there are restrictions on reading the document, and a simplified document image and log information are sent to an external apparatus (for example, an administrator's computer). Therefore, it is possible to improve the effects of inhibiting illegal reading of a document, thus contributing to preventing the leaking of information, without requiring complicated image processing or special mechanisms.

In other words, the detection unit according to the present invention is able to detect the presence or absence of a regular dot pattern, for instance, by means of a method which calculates the dot interval in the dot pattern, or a method which judges the presence or absence of regularity by subjecting the document image to a Gaussian filtering process, or the like, which is a smoothing filter, and then calculating the magnitude of the variation in the density after this processing. In a conventional copying machine which comprises a copy guard function, it is necessary to detect reliably a special dot pattern corresponding to the copy guard function, and costs increase due to the providing of a memory for pattern matching and the complexity of image processing, and the like, but in the present invention, it is sufficient to detect a regular dot pattern (pattern image), and therefore a memory for pattern matching and a circuit for performing complicated image processing are not required and it is possible to increase the effects of inhibiting image reading (copying), while restricting costs.

This application is based on Japanese Patent application serial No. 2008-280105 filed in Japan Patent Office on Oct. 30, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image reading apparatus, comprising:
   a reading unit which acquires a document image by reading a document;
   a detection unit which detects whether or not the document image contains a regular dot pattern in which dots formed according to a predetermined period are arranged in a regular fashion;
   a generation unit which generates a simplified document image from the document image;
   a creation unit which creates log information relating to a reading process by the reading unit; and
   a transmission unit which transmits the simplified document image and the log information to a predetermined external apparatus, when the regular dot pattern has been detected.

2. The image reading apparatus according to claim 1, further comprising a storage unit which stores the simplified document image, wherein
   the generation unit generates the simplified document image by carrying out image size reduction or binarization processing for the document image.

3. The image reading apparatus according to claim 1, further comprising an identification unit which identifies a user, wherein
   the creation unit creates log information including information on a user identified by the identification unit.

4. The image reading apparatus according to claim 1, further comprising a storage unit which stores the simplified document image and an identification number to be attached to the simplified document image, wherein
   the transmission unit transmits the identification number in place of the simplified document image to the external apparatus.

5. The image reading apparatus according to claim 2, further comprising an erasure unit which erases a simplified document image stored in the storage unit when the simplified document image has been transmitted to the external apparatus by the transmission unit.

6. The image reading apparatus according to claim 1, further comprising:
   a display control unit which causes a display unit to display a message indicating that the simplified document image and the log information have been transmitted to an external apparatus by the transmission unit, and a message indicating whether or not to continue reading of the document by the reading unit, when the regular dot pattern is detected;
   an instruction reception unit which receives an input of an instruction as to whether or not to continue the reading of a document by the reading unit; and
   a halting unit which halts reading of a document by the reading unit, when the instruction reception unit has received an input of an instruction indicating that reading is not to be continued.

7. The image reading apparatus according to claim 1, further comprising:
   a display control unit which causes a display unit to display a message indicating that the simplified document image and the log information have been transmitted to an external apparatus by the transmission unit, and a message indicating whether or not to continue reading of the document by the reading unit, when the regular dot pattern is detected; and
   an instruction reception unit which receives an input of an instruction as to whether or not to continue reading of a document by the reading unit, wherein
   the reading unit continues reading of the document when the instruction reception unit has received an input of an instruction to continue the reading.

8. An image forming apparatus, comprising:
   a reading unit which acquires a document image by reading a document;

a detection unit which detects whether or not the document image contains a regular dot pattern in which dots formed according to a predetermined period are arranged in a regular fashion;

a generation unit which generates a simplified document image from the document image;

a creation unit which creates log information relating to a reading process by the reading unit;

a transmission unit which transmits the simplified document image and the log information to a predetermined external apparatus, when the regular dot pattern has been detected; and an image forming unit which generates, on recording paper, an image based on the document image.

* * * * *